United States Patent [19]
Epelbaum

[11] 3,944,241
[45] Mar. 16, 1976

[54] CONVERTIBLE CAR SEAT AND STROLLER
[76] Inventor: Quido C. Epelbaum, 5472 Walshire Drive, Columbus, Ohio 43227
[22] Filed: Aug. 19, 1974
[21] Appl. No.: 498,444

Related U.S. Application Data
[63] Continuation of Ser. No. 301,305, Oct. 27, 1972, abandoned.

[52] U.S. Cl. ......... 280/30; 280/43.24; 280/47.37 R; 297/254
[51] Int. Cl.² ........................................ B62B 1/04
[58] Field of Search ............. 280/30, 31, 38, 47.37, 280/47.38, 43.24, 41 B; 297/254, 250

[56] References Cited
UNITED STATES PATENTS

| | | | |
|---|---|---|---|
| 1,693,633 | 12/1928 | Allen | 280/31 |
| 1,727,335 | 9/1929 | Chatfield | 280/41 B |
| 2,470,040 | 5/1949 | Mackin | 280/47.38 |

FOREIGN PATENTS OR APPLICATIONS

| | | | |
|---|---|---|---|
| 1,937,610 | 2/1971 | Germany | 297/254 |

*Primary Examiner*—Robert R. Song
*Attorney, Agent, or Firm*—Cennamo, Kremlas and Foster

[57] ABSTRACT

A children's car seat which is adapted to convert into a stroller apparatus with minimum of effort and adjustment required by the user. The apparatus includes an adjustable handle means and wheel assemblies which are pivotally mounted between a raised position defining a car seat configuration and a lowered position defining a stroller configuration.

1 Claim, 5 Drawing Figures

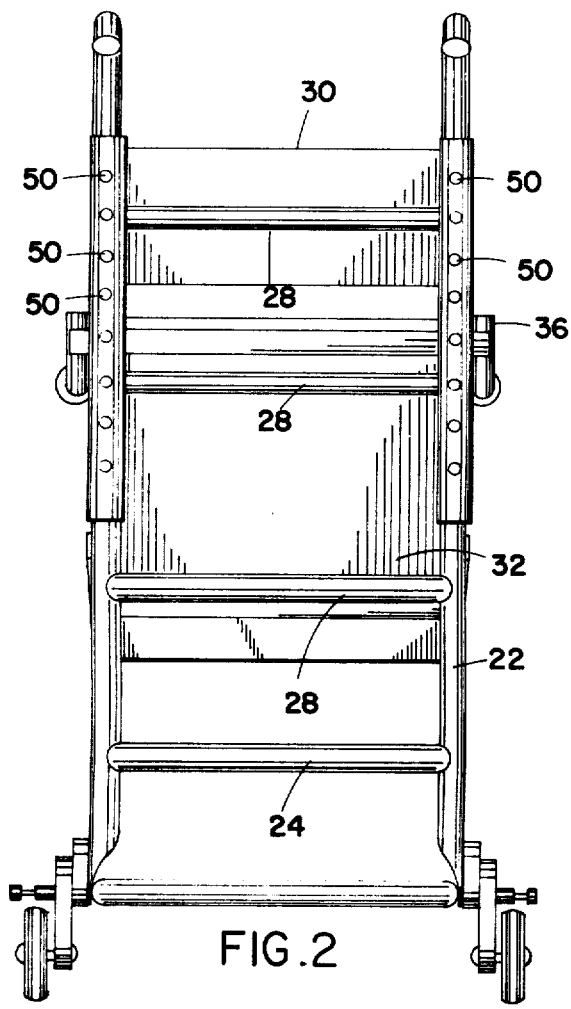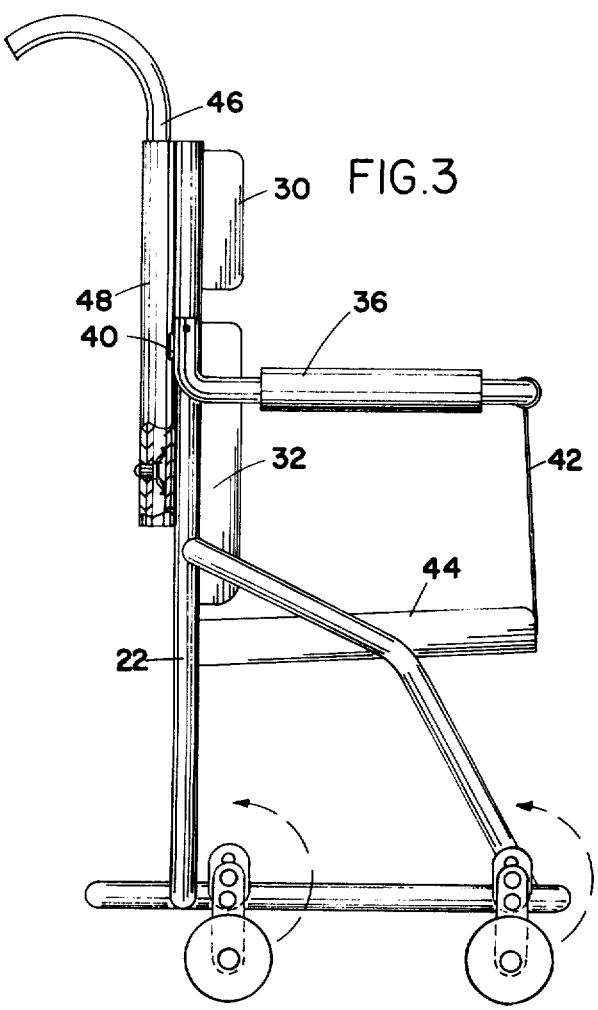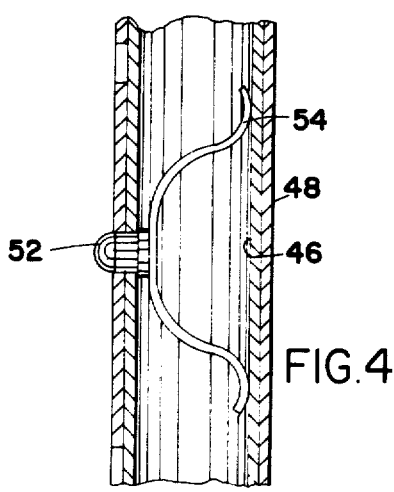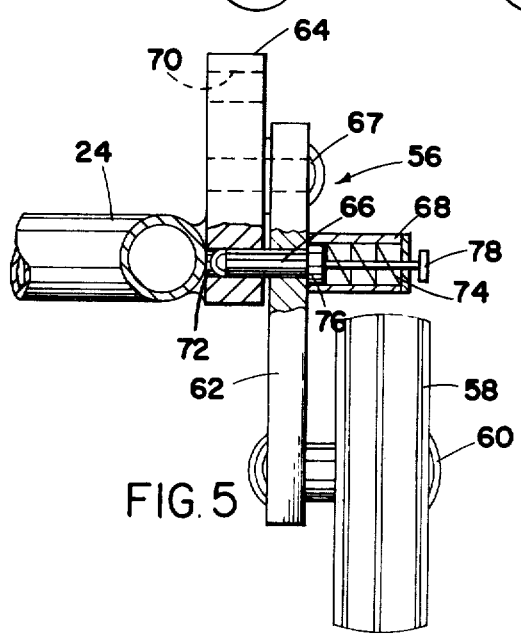

CONVERTIBLE CAR SEAT AND STROLLER

This application is a continuation of my copending application Ser. No. 301,305, filed Oct. 27, 1972, now abandoned.

BACKGROUND

For quite a few years their has been a tremendous increase in the sale of children's car seats and in baby strollers. In addition to the increase in population, their has been an increase in the sales of automobiles and an increase in safety procedures relating thereto. These regulations extend to the manufacture of children's car seats.

However, what has been overlooked by others is the duplication expense relating to the purchase of two separate items to serve the purpose of safely and conveniently transporting small children in the auto and out of the auto on shopping trips and the like.

A further disadvantage relating to prior art constructions is the inconvenience and effort required to remove the separate stroller apparatus from a storage place in the auto when the need for its use arises. This procedure, when multiplied by a plurality of stops at different locations during a shopping tour, becomes extremely cumbersome and frustrating to the user.

SUMMARY OF INVENTION

The present invention relates generally to a combination children's car seat and stroller apparatus which is easily and simply converted from one configuration to the other. The apparatus includes a basic frame which is provided with the conventional seat portion, back portion and head rest portion. However, the frame construction includes, in a direct and simple manner, adjustable handle means and wheel assemblies which cooperate with the other structure in a manner to permit use of said structure in either a car seat or stroller configuration with no duplication of unnecessary parts. Further, the construction of the adaptability features in no way interferes with the federal safety regulations relating to children's car seats.

OBJECTS

It is a primary object of the present invention to provide a combination children's car seat and stroller apparatus which is easily converted from one configuration to the other.

It is another object of the present invention to provide a combination children's car seat and stroller apparatus wherein an economy of structure is realized by utilizing certain portions for similar functions in either configuration.

It is another object of the present invention to provide an apparatus of the type described which may be manufactured and fabricated in a relatively simple manner and yet which is strong and durable.

It is a further object of the present invention to provide an apparatus of the type described which functions in a simple convenient manner and which also qualifies as conforming to federal safety regulations.

Further objects and advantages of the present invention will be apparent from the following description, reference being had to the accompanying drawings wherein preferred forms of embodiments of the invention are clearly shown.

IN THE DRAWINGS

FIG. 2 is a rear elevational view of the apparatus shown in FIG. 1;

FIG. 3 is a side elevational view of the apparatus shown in FIG. 1 including a portion of the adjustable handle means illustrated in partial section taken through the center-line of the handle portion;

FIG. 4 is an elongated side elevational view in section of that portion of the handle means shown in section in FIG. 3; and FIG. 5 is a front elevational view partially in section of a portion of the apparatus shown in FIG. 1 illustrating a wheel assembly construction.

DETAILED DESCRIPTION

Figure 1:
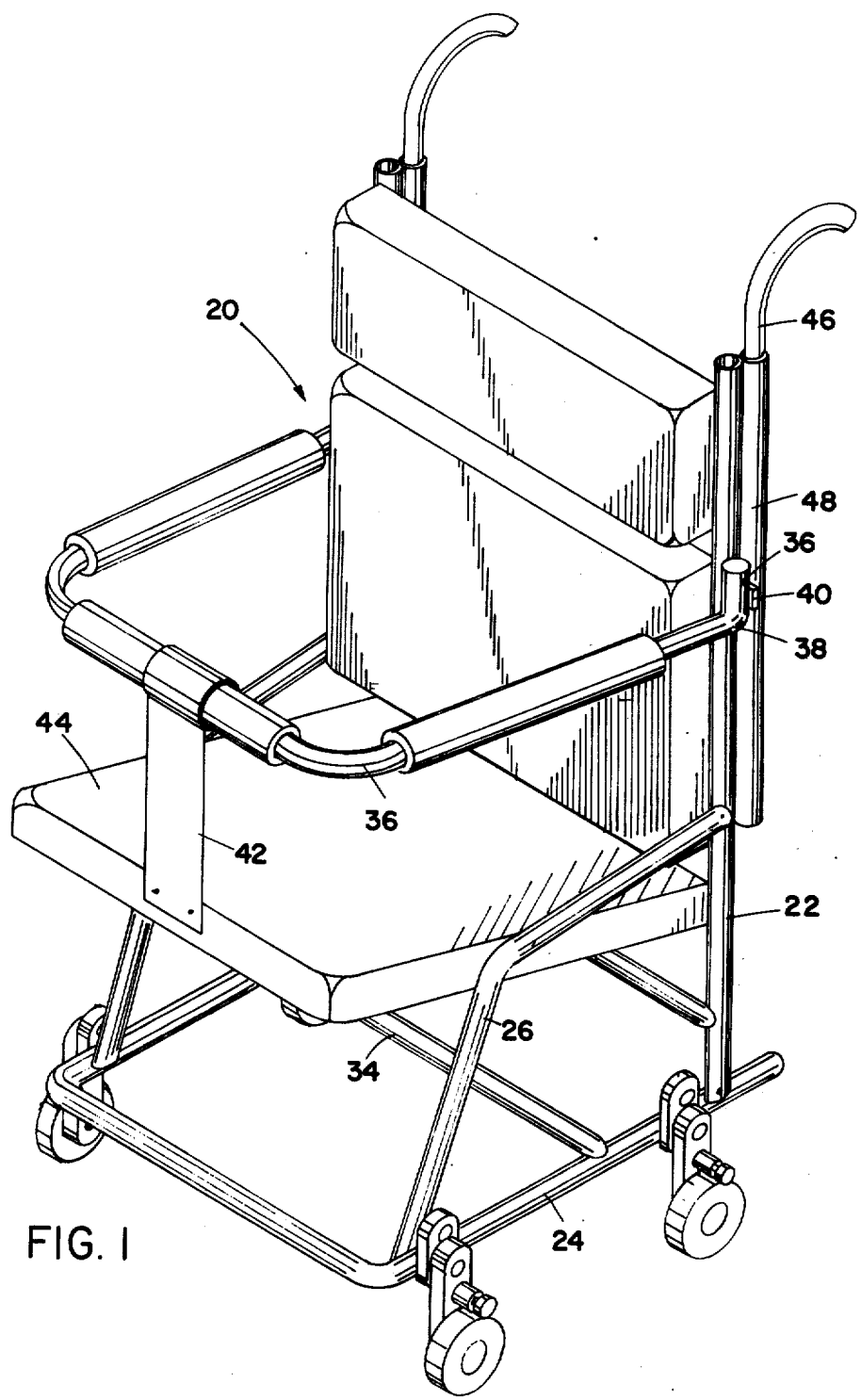
FIG. 1 is a perspective view of a combination children's car seat and stroller apparatus constructed in accordance with the present invention.

A children's car seat and stoller apparatus constructed in accordance with the present invention is illustrated in FIG. 1 and includes a frame means, indicated generally at 20. Frame means 20 includes generally vertical support members 22, base means 24, and side support members 26 securely fastened to one another by suitable rivots or the like.

Vertical support members 22 are provided with cross members 28 to support a cushioned head rest 30 and back support 32 which are securely fastened to frame means 20. Base means 24 is provided with a cross support members 34.

A partially padded restraining bar 36 is pivotally mounted to vertical members 22 such as at pins 38 and restrained from movement past the horizontal position shown by stops 40.

A restraining strap 42 is removably connected between the forward portion of bar 36 and a seat portion 44, seat portion 44 being fastened to both vertical support 22 and side supports 26.

Adjustable handle means are provided in the tubular portions 46 slideably mounted within outer tubes 48 which, in turnm are rigidly fastened to the rear of vertical members 22.

Outer tubes 48 include a plurality of vertical spaced holes 50 adapted to receive a button 52 outwardly biased by spring member 54. By pushing button 52 inwardly, portions 46 may be moved vertically to the next adjacent hole 50.

Base means 24 is provided with four wheel assemblies, indicated generally at 56, each of which include wheel 58 rotatable mounted by a pin 60 to a strut member 62.

Strut 62 is pivotally mounted to a bracket member 64 via a pin 67. Bracket 64, in turn, is fixedly connected to a base means 24 such as by welding, for example.

Strut 62 is releasably locked in either a raised configuration or a lowered configuration by a locking pin 66 slideably mounted in a housing 68 fixed to strut 62 in any suitable manner. Pin 66 is adapted to extend through an upper hole 70 or a lower hole 72 depending upon whether strut 66 is in the raised or lowered configuration.

Pin 66 is biased inwardly by a spring 74 which is mounted within housing 68 between one end of the housing and an enlarged collar portion 76 of pin 66.

Pin 66 also includes an outer head portion 78 which extends outwardly of housing 68 to permit the user to conveniently pull pin 66 outwardly when adjusting the position of strut 62.

In use, one merely positions the handle portion 46 in the lowered position and the wheels 58 in the raised position. As described above, this is accomplished simply and quickly by pulling pin 66 outwardly of hole 72 and pivoting the respective strut 62 upwardly until it is aligned with upper hole 70. Release of pin 66 permits the pin to enter hole 70 to fix the position of wheel 58.

In this configuration, the apparatus is ready for use as a conventional car seat as the auto seat belts are used to fasten the child and the seat safely to the auto seat.

When the stroller configuration is desired, the apparatus is removed from the auto. By merely following the same procedure described before, the struts 62 are pivoted to the lowered position. Handle portions 42 are raised to a comfortable position and the apparatus quickly assumes a stroller configuration.

From the foregoing description, it should be readily apparent that the apparatus serves a dual function with a minimum effort required to convert it from one configuration to another. Further, the construction is relatively simple and inexpensive as compared to two separate devices which were heretofore manufactured and offered to the consumer.

What is claimed is:

1. A children's car seat adapted for conversion to a stroller apparatus comprising, in combination, a generally L-shaped frame means including substantially vertically disposed support members and a horizontally disposed base means adapted to rest substantially flush with the horizontally portion of an auto seat with the vertical frame portion substantially flush to the upright portion of the auto seat; a seat portion connected to said frame means and including a back rest portion, said seat portion being vertically spaced above said base means and including means to restrain a child's forward and sideward movement; handle means mounted on said frame means; wheel means rotatably mounted in a strut portion, said strut portion pivotally mounted to said base means to define raised and lowered positions of said wheel means; and means for releasably fixing the position of said strut portion including a locking pin assembly slideably mounted through said strut and alternately engageable with one of at least a pair of locking holes disposed in a bracket member fixed to said base means; the lower edge of said bracket member and said strut portion when it is disposed in a raised position being in substantially the same horizontal plane as the lower edge of said base means.

* * * * *